United States Patent
Smetana

(10) Patent No.: US 9,249,878 B2
(45) Date of Patent: Feb. 2, 2016

(54) SHIFTING DEVICE COMPRISING A COUPLING DEVICE

(75) Inventor: Tomas Smetana, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/111,063

(22) PCT Filed: Mar. 12, 2012

(86) PCT No.: PCT/EP2012/054215
§ 371 (c)(1),
(2), (4) Date: Nov. 18, 2013

(87) PCT Pub. No.: WO2012/139834
PCT Pub. Date: Oct. 18, 2012

(65) Prior Publication Data
US 2014/0123794 A1    May 8, 2014

(30) Foreign Application Priority Data

Apr. 13, 2011 (DE) .............. 102011007266

(51) Int. Cl.
| F16H 61/32 | (2006.01) |
| F16D 23/06 | (2006.01) |
| F16D 23/12 | (2006.01) |
| F16D 28/00 | (2006.01) |
| F16D 27/118 | (2006.01) |

(52) U.S. Cl.
CPC .............. *F16H 61/32* (2013.01); *F16D 23/06* (2013.01); *F16D 23/12* (2013.01); *F16D 27/118* (2013.01); *F16D 28/00* (2013.01); *F16D 2023/0687* (2013.01); *F16D 2023/123* (2013.01); *Y10T 74/19251* (2015.01)

(58) Field of Classification Search
CPC ............... F16H 61/32; F16H 61/0403; F16H 2061/326; F16H 23/02–23/0612; F16H 23/12; F16H 23/14; F16H 2023/0618–2023/0687; F16H 48/06; F16H 2121/24; F16H 2125/20; F16H 2121/34; F16H 2500/10456; F16H 2500/10462

See application file for complete search history.

(56) References Cited

U.S. PATENT DOCUMENTS

| 4,368,808 | A  | * | 1/1983 | Teraoka ..................... 192/69.4 |
| 5,363,712 | A  |   | 11/1994 | Muller |
| 8,047,349 | B2 |   | 11/2011 | Weule |
| 2003/0200829 | A1 |   | 10/2003 | Vukovich et al. |
| 2009/0127059 | A1 |   | 5/2009 | Knolauch |
| 2010/0219034 | A1 |   | 9/2010 | Wheals et al. |
| 2012/0037472 | A1 | * | 2/2012 | Rosemeier et al. .......... 192/66.1 |

FOREIGN PATENT DOCUMENTS

| CN | 101273212 | 9/2008 |
| DE | 4205670 | 6/1993 |
| DE | 102006042477 | 3/2008 |

(Continued)

*Primary Examiner* — Jacob S Scott
(74) *Attorney, Agent, or Firm* — Davidson, Davidson & Kappel, LLC

(57) ABSTRACT

A shifting device including at least one coupling device, a shaft, a sliding sleeve-of the coupling device which is arranged in an axially moveable and rotationally fixed manner on the shaft and an actuator arrangement of the coupling device for axially moving the sliding sleeve. At least one coupling toothing is associated with the coupling element which can rotate about a rotational axis with respect to the shaft and a counter toothing corresponding to the coupling toothing is associated with the sliding sleeve in a rotationally fixed manner. At least one annular actuator element of the actuator arrangement surrounds the periphery of the sliding sleeve about the rotational axis.

8 Claims, 3 Drawing Sheets

(56) References Cited

FOREIGN PATENT DOCUMENTS

| EP | 0698748 | 2/1996 |
| EP | 1357317 | 10/2003 |
| EP | 1977130 | 10/2008 |
| JP | 1037977 | 2/1998 |
| WO | WO 2007034208 | 3/2007 |

* cited by examiner

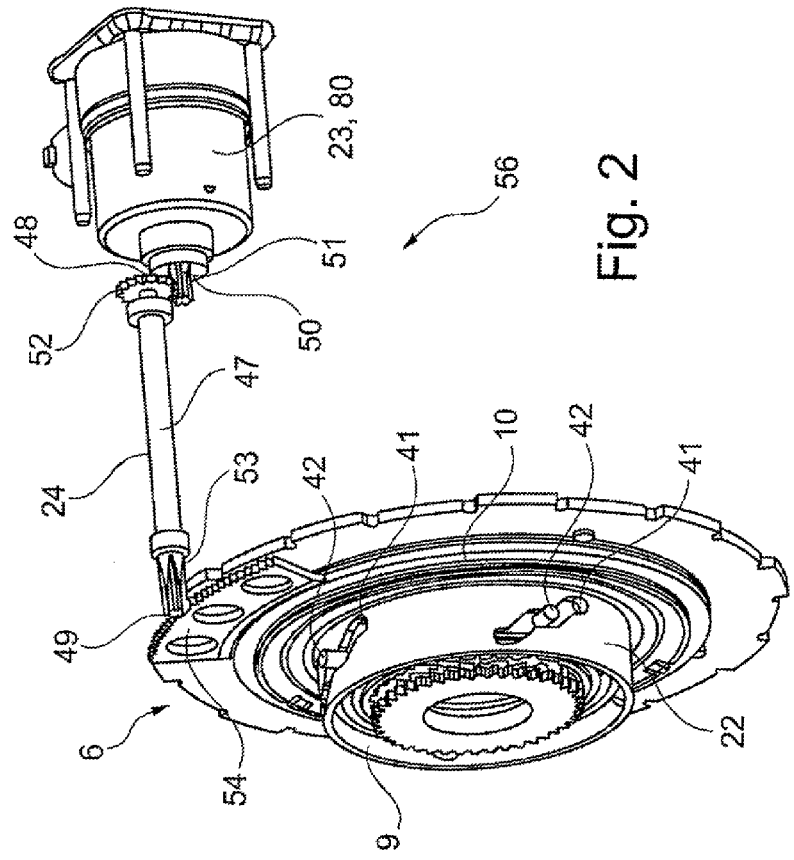
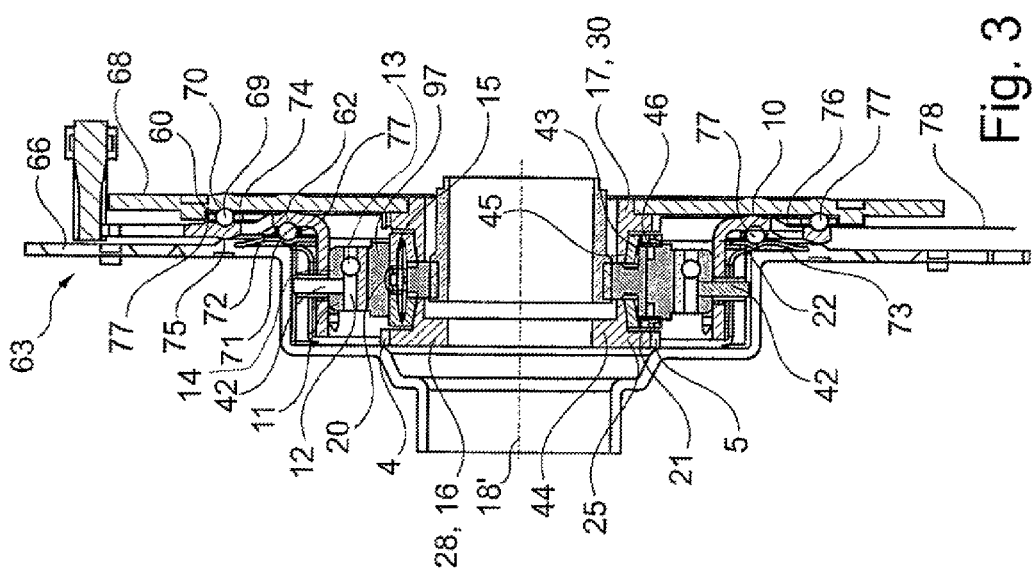

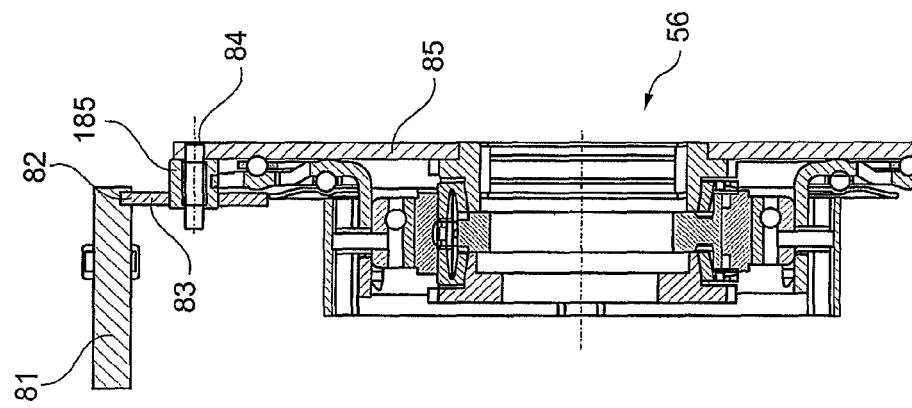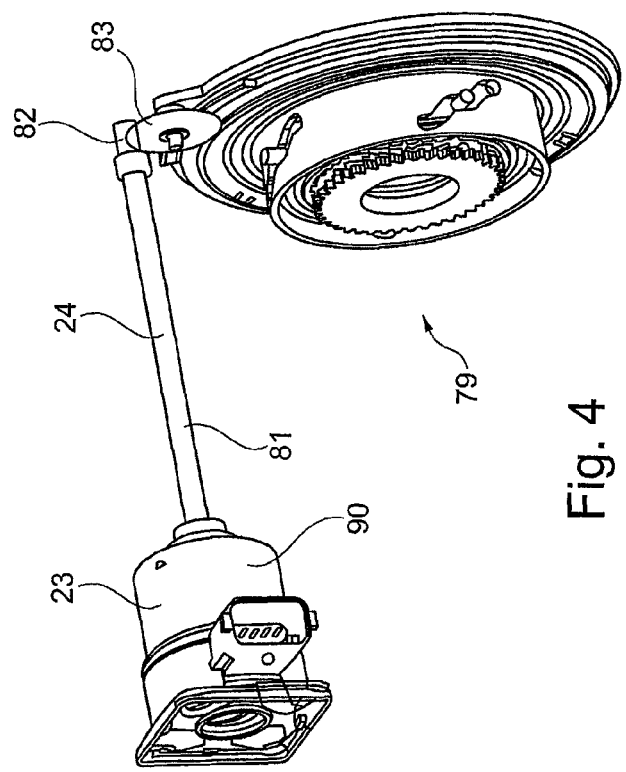

SHIFTING DEVICE COMPRISING A COUPLING DEVICE

The present invention relates to a shifting device which has at least one coupling device, a shaft, a shifting collar of the coupling device which is situated in an axially shiftable and rotatably fixed manner on the shaft and an actuator system of the coupling device for axially shifting the shifting collar, at least one coupling toothing being assigned to the coupling element, which is able to rotate around a rotation axis relative to the shaft, and at least one mating toothing corresponding to the coupling toothing being rotatably fixedly assigned to the shifting collar, and at least one annular actuator element of the actuator system surrounding the shifting collar around the rotation axis on the circumferential side.

BACKGROUND

EP 1977130 B1 shows a shifting device of this type. The shifting device has a coupling element which is rotatably supported on the shaft relative to the shaft. The coupling element should be rotatably fixedly connected to the shaft via the shifting collar upon engagement of a gear and be able to rotate again relative to the shaft upon changing gears. For this purpose, the shifting collar is situated on the shaft in an axially shiftable and rotatably fixed manner and therefore is shiftably supported on a hub which is fixedly connected to the shaft.

The rotatably fixed, detachable connection between the shifting collar and the coupling element is implemented with the aid of tooth engagement. For this purpose, a coupling toothing, which corresponds to a mating toothing on the shifting collar, is provided on the coupling element. The teeth of the toothings and the tooth gaps are longitudinally oriented, so that when a gear is engaged, the teeth of the mating toothing are insertable into the tooth gaps of the coupling toothing until the teeth of the toothings are alternately opposite each other in the circumferential direction and are thus rotatably fixedly coupled. An electromagnetic actuator system for actuating the shifting collar or an annular element of the actuator system surrounds the shifting collar on the circumferential side, so that the shifting device may have a very compact design.

Coupling elements may be, for example, gear wheels, so-called idler gears, on which the coupling toothing is provided directly. Alternatively the coupling elements are coupling members having the coupling toothing which are rotatably fixedly coupled with a gear wheel.

The installation space required by a shifting device of this type is dependent on the radial and axial dimensions of the coupling element and the shifting collar. The dimensions of the electromagnetic actuator are dependent on the forces needed for shifting. The installation space required by the shifting device is therefore essentially also influenced by the size of the actuator system and may therefore be large if a great deal of power is required.

SUMMARY OF THE INVENTION

It is an object of the present invention to provide a shifting device in which the installation space required is largely independent of the shifting forces.

The present invention provides that the annular actuator element is at least one gear shift drum. A gear shift drum is understood to be a component of a partially hollow cylindrical design or a completely hollow cylindrical design which is preferably made of sheet metal.

The gear shift drum has at least one guideway but may also have two or more guideways. The guideways are, for example, grooves which are introduced into the gear shift drum. These grooves radially penetrate the wall of the gear shift drum or have a closed groove base. In gear shift drums made of sheet metal, the guideways are punched or rolled in. Punched guideways extend beyond a partial circumference and are provided on gear shift drums which are pivotable around the pivot axis. The pivot axis corresponds to the rotation axis of the coupling element. Rolled-in guideways extend beyond a partial circumference and are provided on pivotable gear shift drums. Alternatively, the rolled-in guideways run around the entire circumference, so that they may also be used on rotating gear shift drums.

Alternatively, the guideways are rail-like structures which are mounted radially on the inner circumference of the gear shift drum or which project from the inner circumferential surface of the gear shift drum and which are provided with a simple I-shaped or U-shaped design in any longitudinal sections along the rotation axis and whose legs project radially to the inside.

Mounted or projecting guideways extend beyond a partial circumference and are provided on pivotable gear shift drums. Alternatively, the mounted or projecting guideways run around the entire circumference, so that they may also be used on rotating gear shift drums.

The guideways are essentially oriented in the circumferential direction of the gear shift drum, i.e., also in the circumferential direction around the rotation or pivot axis, but they do not run on a circumferential line but are deflected from an imaginary circumferential line in axial directions, optionally run back in the axial direction, etc. This course is dependent on the shifting times and the axial lift to be covered by the shifting collar.

A guiding element is coupled with the shifting collar in such a way that the shifting collar is rotatable around the rotation axis relative to the guiding element but may be entrained by the guiding element in the axial direction. The guiding element radially engages with the particular guideway. The gear shift drum having the guideway is movable relative to the guiding element, so that the guiding element is positively moved axially in a pivoted or rotating guideway and axially entrains the shifting collar.

The pivot or rotary drive of the gear shift drum is integrated, for example, into the gear shift drum and is preferably electromotive. However, the drive of the gear shift drum is preferably situated outside the gear shift drum. The latter approach has the advantage that a coupling device may be concentrically integrated into the gear shift drum, as provided by one embodiment of the present invention. In this case, the gear shift drum itself takes up only the radial installation space, which is determined by the wall thickness of its hollow cylinder and the height of any projecting guideways. The dimensions of the annular actuator element are thus essentially independent of the shifting forces. In this case, the gear shift drum may be connected to the drive by a geared connection. Geared connections are belt or chain drives or gear stages. One element, for example a gear wheel or a pulley, is attached to the gear shift drum. Alternatively, this element is integrated into a gear shift drum as a single piece, for example as a toothing on a spur wheel section.

One embodiment of the present invention provides that the gear shift drum has a radial flange which projects radially beyond the circumference of the gear shift drum. At least one element of the geared connection is attached to or formed on this flange. The flange is optionally also used for the pivotable or rotatable support of the gear shift drum in relation to the surrounding structure.

Other embodiments of the present invention relate to a shifting device in which the coupling device is at least partially concentrically situated within the gear shift drum. The coupling device has the shifting collar and at least one coupling member, preferably two coupling members. In the latter case, the shifting collar has a dual-action design and is mounted axially between the two coupling members. The coupling toothing is provided on each coupling member.

The shifting collar is axially shiftably positioned either directly on a shaft or on a hub which is formed with the shaft or is attached thereto. The sliding seat in both cases is supported on a sliding or rolling bearing with the aid of splines or other suitable profiles.

One embodiment of the present invention provides that one or multiple locking elements is/are situated radially between the hub and the shifting collar. The locking element(s) is/are made of at least one spring and one bolt pretensioned by the spring, alternatively having a pretensioned ball. The locking element is guided or held in the hub and supported radially against the spring forces. The ball or the locking bolts interlock with trough-shaped indentations when the gears are engaged or in the neutral position and thereby hold the shifting collar in the desired position relative to the shaft.

One embodiment of the present invention provides that the coupling device has at least one friction surface which is torsionally fixedly coupled with the shaft but is able to be shifted axially relative to the shaft with the aid of the shifting collar. The friction surface is shiftable on a mating friction surface which is torsionally fixedly coupled with the coupling element and corresponds to the friction surface. The friction surfaces are provided on separate friction members. One of the friction members is torsionally fixedly coupled with the shaft and may be axially shifted by the shifting collar. The other friction member is rotatably fixedly coupled with the coupling member. Alternatively, the friction surfaces are provided directly on the shifting collar or the coupling member. The shaft and the particular coupling member may be braked against each other with the aid of a friction coupling of this type between the shaft and the particular coupling member until the rotational speeds are synchronous. As in the case of synchronous couplings, the engagement of the particular gear is comfortable with the aid of an arrangement of this type.

BRIEF DESCRIPTION OF THE DRAWINGS

FIG. 2 shows the shifting device 56 in an overall view including drive 23 and geared connection 24.

FIG. 3 shows coupling device 58 in a longitudinal sectional view along main axis 18 according to FIG. 2.

FIGS. 4 and 5 shows a shifting device 56 which essentially corresponds to shifting device 56 described in FIGS. 2 and 3, whose actuator system 79, is provided with modifications of drive 23 and geared connection 24.

DETAILED DESCRIPTION

Figure 1:
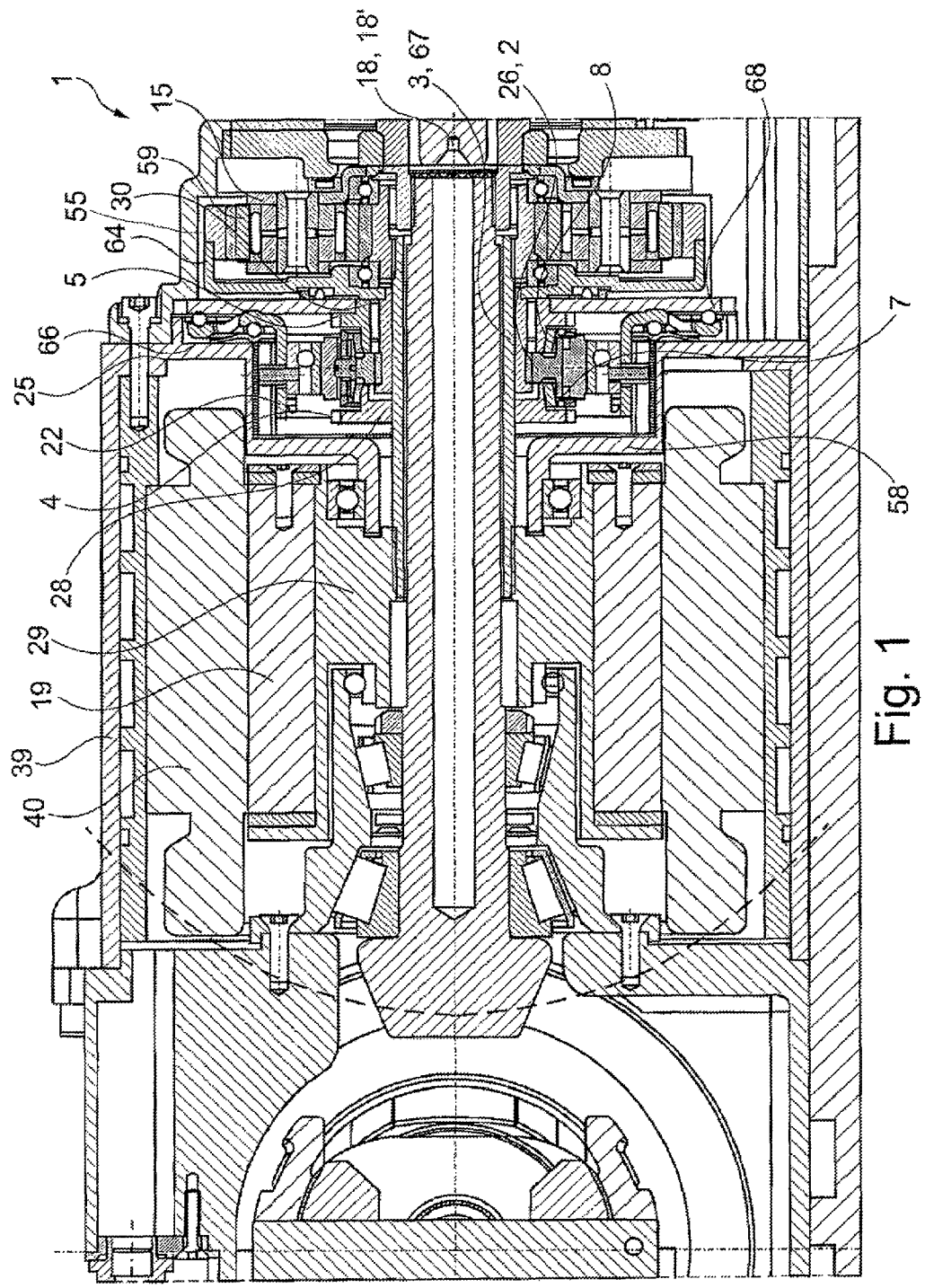
FIG. 1 shows an electromotively driven drive unit 1 in a longitudinal sectional view along its main axis 18, drive unit 1 including an electric machine 19 and a transmission 55.

FIG. 1: Coupling device 25 has a gear shift drum 22, coupling elements 26, 28 and 30, a shifting collar 97 and a guiding element 42. Shifting collar 97 is mounted in an axially shiftable and rotatably fixed manner on coupling element 26, which is designed as a hub 2. Hub 2 is rotatably fixedly situated on a shaft 3 which is part of connecting shaft 67 of planetary gear 59 and to which an annulus gear 64 of planetary gear 59 is connected. Actuator system 6 of coupling device 58 is illustrated in its entirety in FIG. 2.

Coupling element 28 is rotatably situated on a rotor shaft 29 of electric machine 19 around rotation axis 18' on main axis 18 relative to shaft 3 and has a coupling toothing 4. Coupling element 30 is fixed on a housing 39; however, shaft 3 is able to rotate around rotation axis 18' relative to coupling element 30. Coupling element 30 is provided with a coupling toothing 5. Shifting collar 97 has a mating toothing 7 and 8 on each side in the axial direction. Toothings 7 and 8 correspond to particular coupling toothings 4 and 5, which are located axially opposite each other.

The annular actuator element designed as gear shift drum 22 is hollow cylindrical and surrounds shifting collar 97 and coupling elements 26, 28 and 30, running around rotation axis 18' on the circumferential side.

FIGS. 2 and 3: As is apparent, in particular, from FIGS. 2 and 3, gear shift drum 22 has a hollow cylindrical section 9 and a radial flange 10. Hollow cylindrical section 9 and radial flange 10 form a single piece with each other. Guideways 41 are provided in section 9. However, each of guideways 41 is essentially not aligned with a circumferential line but is deflected axially to the left and right. As a result, particular guideway 41 has a curve-shaped course.

Particular guiding element 42, which engages with one of guideways 41, is fixedly inserted into an outer bearing ring 11. Outer bearing ring 11 is a component of a rolling bearing 12, which furthermore includes an inner bearing ring 14 and rolling members 13. Rolling members 13 are balls and are radially situated between inner and outer bearing rings 14 and 11. Inner bearing ring 14 is fixedly mounted on shifting collar 97. An axially fixed connection is established between shifting collar 97 and gear shift drum 22 via guiding elements 42 engaging with guideways 41 and rolling bearing 12 in such a way that shifting collar 97 is axially entrained when gear shift drum 22 pivots around rotation axis 18'. However, shifting collar 97 is movable relative to gear shift drum 22 due to rolling bearing 12.

Shifting collar 97 is axially shiftably connected to hub 2 via a spline or similar shaft-hub connections and, according to the representation in FIG. 3, it is in a neutral position between toothings 4 and 5 on coupling elements 28 and 30 designed as coupling members 16 and 17. A locking element 15 is accommodated in hub 2. Locking element 15 is radially pretensioned against shifting collar 97 by a screw spring and interlocked in an indentation 20 in shifting collar 97.

Coupling device 58 has friction members 25 and 43 which are torsionally fixedly coupled with hub 2 but are axially shiftable in relation to hub 2 with the aid of shifting collar 97. An inner conical friction surface 44 or 45 is provided on each of friction members 25 and 43. An outer conical mating friction surface 21 or 46 for particular friction surface 44 or 45 is provided on each of coupling members 16 and 17. Friction surface 44 may be frictionally engaged with mating friction surface 21 and friction surface 45 may be frictionally engaged with mating friction surface 46 by axially shifting shifting collar 97.

Actuator system 6 has an electric motor 80 as drive 23 which is situated in parallel to electric machine 19. A geared connection 24 is formed by an intermediate shaft 47 and two gear stages 48 and 49. Gear stage 48 has a pinion 50, which is provided on pivot shaft 51 of electric motor 80, and a spur wheel 52 on intermediate shaft 47, which are in tooth engagement with each other. Gear stage 49 is provided with a pinion 53, which is provided on intermediate shaft 47 and which is in tooth engagement with a tooth segment 54. Tooth segment 54 is provided on flange 10 or is alternatively attached thereto.

FIGS. 1 and 3: Flange 10 is rotatably supported on surrounding structure 63 with the aid of two rolling bearings 60 and 62 in a pivotable manner around rotation axis 18'. Surrounding structure 63 includes an end shield 66 and an intermediate wall 68 which are fixed to housing 39. End shield 66 separates an inner chamber of electric machine 19, which includes stator 40 and rotor 38, and rotor shaft 29 from coupling device 58. Rotor shaft 29 is also supported on end shield 66. Coupling device 58 and planetary gear 59 are separated from each other by intermediate wall 68.

FIG. 3: Rolling bearing 60 has a track 69, oriented in the circumferential direction, which is provided directly in flange 10, e.g., by embossing in flange 10. Another track 70 is provided in a mirror-image configuration in intermediate wall 68. Rolling bearing 62 has a track 71, oriented in the circumferential direction, which is provided directly in flange 10. A track 72, which is provided on a spring element 73, is provided in a mirror-image configuration in relation to track 71. Multiple balls 77 are situated between tracks 69 and 70 as rolling members.

Spring element 73 is either attached to or at least axially supported on end shield 66. The rolling bearing arrangement is axially pretensioned between end shield 66 and intermediate wall 68 with the aid of elastically resilient spring element 73. Tracks 69, 70, 71 and 72 either run as circular tracks around the entire circumference or are circular arc segment tracks whose arc angle corresponds to the maximum pivot angle of gear shift drum 22. In the latter arrangement, at least two of the same circular arc segment tracks are situated on the circumferential side. Tracks 69, 70, 71 and 72 are also designed as ball grooves/track grooves which form a trough adapted to balls 77 in the longitudinal sectional view.

Tracks 69 and 70 are radially offset in relation to tracks 71 and 72. The one track 69 is provided on the one axially oriented front face 74 of flange 10, and the other track 71 is provided on a front face 75 of flange 10 which is oriented in the opposite direction from front face 74. Due to an offset 76 in flange 10, which is provided radially between tracks 69, and due to the trough-shaped molding of the track grooves in the longitudinal sectional view, the ball grooves touch a shared imaginary radial plane 78 at their axially lowest point, radial plane 78 being axially penetrated perpendicularly by rotation axis 18' and therefore intersecting both tracks 71 and 72 in the groove base. As a result, the roller bearing arrangement requires less axial installation space.

FIGS. 4 and 5 shows a shifting device 56 which essentially corresponds to shifting device 56 described in FIGS. 2 and 3, whose actuator system 79, however, is provided with modifications of drive 23 and geared connection 24. Electric motor 90 of actuator system 79 has a pivot shaft 81 on which a pinion 82 is provided. Pinion 82 is in tooth engagement with a reversing gear wheel 83, which is rotatably supported on an intermediate shaft 84 with the aid of a hub 185. Intermediate shaft 84 is fixed to an intermediate wall 85.

| List of Reference Numerals | |
|---|---|
| 1 | Drive unit |
| 2 | Hub |
| 3 | Shaft |
| 4 | Coupling toothing |
| 5 | Coupling toothing |
| 6 | Actuator system |
| 7 | Mating toothing |
| 8 | Mating toothing |
| 9 | Hollow cylindrical section |
| 10 | Flange |
| 11 | Outer bearing ring |

| List of Reference Numerals | |
|---|---|
| 12 | Rolling bearing |
| 13 | Rolling member |
| 14 | Inner bearing ring |
| 15 | Locking element |
| 16 | Coupling member |
| 17 | Coupling member |
| 18 | Main axis |
| 19 | Electric machine |
| 20 | Indentation |
| 21 | Mating friction surface |
| 22 | Gear shift drum |
| 23 | Drive for gear shift drum |
| 24 | Geared connection |
| 25 | Friction member |
| 26 | Coupling element |
| 27 | Output shaft |
| 28 | Coupling element |
| 29 | Rotor shaft |
| 30 | Coupling element |
| 39 | Housing |
| 40 | Stator |
| 41 | Guideway |
| 42 | Guiding element |
| 43 | Friction member |
| 44 | Friction surface |
| 45 | Friction surface |
| 46 | Mating friction surface |
| 47 | Intermediate shaft |
| 48 | Gear stage |
| 49 | Gear stage |
| 50 | Pinion |
| 51 | Pivot shaft |
| 52 | Spur wheel |
| 53 | Pinion |
| 54 | Tooth segment |
| 55 | Transmission |
| 56 | Shifting device |
| 57 | Geared connection |
| 58 | Coupling device |
| 59 | Planetary gear |
| 60 | Rolling bearing |
| 61 | Sun wheel |
| 62 | Rolling bearing |
| 63 | Surrounding structure |
| 64 | Annulus gear |
| 65 | Connecting shaft |
| 66 | End shield |
| 67 | Connecting shaft |
| 68 | Intermediate wall |
| 69 | Track |
| 70 | Track |
| 71 | Track |
| 72 | Track |
| 73 | Spring element |
| 74 | Front face |
| 75 | Front face |
| 76 | Offset |
| 77 | Balls |
| 78 | Radial plane |
| 79 | Actuator system |
| 80 | Electric motor |
| 81 | Pivot shaft |
| 82 | Pinion |
| 83 | Reversing gear wheel |
| 84 | Intermediate shaft |
| 85 | Intermediate wall |
| 86-89 | |
| 90 | Electric motor |
| 91-96 | |
| 97 | Shifting collar |

What is claimed is:

1. A shifting device comprising:
at least one coupling device having a shifting collar and an actuator system, the actuator system including at least one annular actuator element;

a shaft, the shifting collar situated in an axially shiftable and rotatably fixed manner on the shaft, the actuator system for axially shifting the shifting collar;

at least one coupling toothing being assigned to a coupling element to be rotatable around a rotation axis relative to the shaft; and at least one mating toothing corresponding to the coupling toothing being rotatably fixedly joined to the shifting collar, the annular actuator element surrounding the shifting collar around the rotation axis on the circumferential side, the annular actuator element being at least one gear shift drum having at least one guideway, a guiding element connected to the shifting collar radially engaging with the guideway, and the gear shift drum being at least pivotable around the rotation axis and thus movable relative to the guiding element together with the guideway wherein the coupling device has at least one friction surface rotatably fixedly coupled with the shaft but is axially shiftable in relation to the shaft with the aid of the shifting collar, the friction surface being shiftable on a mating friction surface rotatably fixedly coupled with the coupling element and corresponds to the friction surface.

2. The shifting device as recited in claim 1 wherein the coupling toothing is provided on the coupling member.

3. The shifting device as recited in claim 1 wherein the shifting collar is mounted in an axially shiftable manner on a hub connected to the shaft.

4. The shifting device as recited in claim 1 wherein the mating friction surface is provided on the friction member in a conical manner.

5. The shifting device as recited in claim 1 wherein the mating friction surface is provided on the coupling element, the coupling element being designed as a coupling member having the coupling toothing.

6. The shifting device as recited in claim 1 wherein the coupling device has an additional coupling element, the shaft and the additional coupling element being movable relative to each other around the rotation axis, and the shifting collar being axially shiftably situated between the two coupling elements.

7. The shifting device as recited in claim 1 wherein the actuator system has at least one drive including a motor, the motor being connected to the gear shift drum in a geared manner.

8. A shifting device comprising:
at least one coupling device having a shifting collar and an actuator system, the actuator system including at least one annular actuator element;
a shaft, the shifting collar situated in an axially shiftable and rotatably fixed manner on the shaft, the actuator system for axially shifting the shifting collar;
at least one coupling toothing being assigned to a coupling element to be rotatable around a rotation axis relative to the shaft;
at least one mating toothing corresponding to the coupling toothing being rotatably fixedly joined to the shifting collar, the annular actuator element surrounding the shifting collar around the rotation axis on the circumferential side; and
a locking element pretensioned in an elastically resilient manner against the shifting collar and supported on the hub, the shifting collar having at least one radial indentation corresponding to the locking element
the annular actuator element being at least one gear shift drum having at least one guideway, a guiding element connected to the shifting collar radially engaging with the guideway, and the gear shift drum being at least pivotable around the rotation axis and thus movable relative to the guiding element together with the guideway.

* * * * *